United States Patent
Yamaura et al.

(10) Patent No.: US 6,846,593 B2
(45) Date of Patent: Jan. 25, 2005

(54) NEGATIVE ELECTRODE FOR NON-AQUEOUS ELECTROLYTE SECONDARY BATTERY AND BATTERY EMPLOYING THE SAME

(75) Inventors: Junichi Yamaura, Kobe (JP); Masaki Hasegawa, Hirakata (JP); Shuji Tsutsumi, Katano (JP); Shinji Kasamatsu, Katano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 321 days.

(21) Appl. No.: 10/089,956

(22) PCT Filed: Aug. 1, 2001

(86) PCT No.: PCT/JP01/06640
§ 371 (c)(1),
(2), (4) Date: Apr. 4, 2002

(87) PCT Pub. No.: WO02/13294
PCT Pub. Date: Feb. 14, 2002

(65) Prior Publication Data
US 2003/0064289 A1 Apr. 3, 2003

(30) Foreign Application Priority Data
Aug. 4, 2000 (JP) ........................................ 2000-237078
Jun. 26, 2001 (JP) ........................................ 2001-193389

(51) Int. Cl.$^7$ .............................................. H01M 4/58
(52) U.S. Cl. .............................................. 429/231.95
(58) Field of Search .................... 429/231.95, 231.1, 429/231.8

(56) References Cited

FOREIGN PATENT DOCUMENTS

| JP | 07-078609 A | 3/1995 |
|---|---|---|
| JP | 09-235111 A | 9/1997 |
| JP | 11-288705 A | 10/1999 |
| JP | 11-297310 A | 10/1999 |
| JP | 2000-164207 A | 6/2000 |
| JP | 2001-052699 A | 2/2001 |

OTHER PUBLICATIONS

JPO Web–site machine translation of JP 09–235111–A.*
JPO Web–site machine translation of JP 11–288705–A.*
Tokumitsu, K., et al., Electrochemical Insertion of Lithium into Hard Carbon Synthesized from Condensed Aromatics, *The Committee of Battery Technology, The 39th Battery Symposium in Japan*, pp. 434–444 (1998).

* cited by examiner

*Primary Examiner*—Gregg Cantelmo
(74) *Attorney, Agent, or Firm*—Akin Gump Strauss Hauer & Feld, LLP (57) ABSTRACT

100 parts by weight of a carbon material having irreversible capacity and 20 to 150 parts by weight of a lithium-containing complex nitride represented by the general formula $Li_{3-x}M_xN$ wherein M is at least one selected from the group consisting of Co, Ni, Mn and Cu, and wherein $0.2 \leq X \leq 0.8$, are included in a negative electrode thereby to compensate for the irreversible capacity of the carbon material by the above-described nitride. This enables the maximum utilization of large capacity possessed by an amorphous carbon or low crystalline carbon, thereby making it possible to provide a non-aqueous electrolyte secondary battery having high capacity and excellent cycle reversibility.

4 Claims, 2 Drawing Sheets

NEGATIVE ELECTRODE FOR NON-AQUEOUS ELECTROLYTE SECONDARY BATTERY AND BATTERY EMPLOYING THE SAME

TECHNICAL FIELD

The present invention mainly relates to a negative electrode yielding a high-capacity non-aqueous electrolyte secondary battery with excellent charge/discharge cycle characteristic.

BACKGROUND ART

At present, non-aqueous electrolyte secondary batteries such as a lithium ion battery using, as the active material, a material capable of reversibly absorbing and desorbing lithium ion have been put into practical use.

For the positive electrode of the non-aqueous electrolyte secondary battery, for example, $LiCoO_2$, which is a lithium-containing complex oxide, is being employed. Li ions are originally contained in the positive electrode, and the Li ions are reversibly absorbed in and desorbed from a carbon material in the negative electrode during charge and discharge.

Apart from $LiCoO_2$, lithium-containing complex oxides include $LiNiO_2$, $LiMn_2O_4$ and complexes thereof. These oxides exhibit a potential as high as about +4 V with respect to the potential of metallic lithium and also have large reversible capacity. Therefore, they are excellent materials for use as active materials, capable of realizing batteries of high voltage and high capacity.

On the other hand, for the negative electrode of the non-aqueous electrolyte secondary battery, carbon materials are commonly used. Carbon materials are also capable of reversibly absorbing and desorbing Li ions. However, in the case of graphite, for example, the theoretical upper limit for the amount of Li to be absorbed is the amount required for formation of $C_6Li$, that is, one Li atom per six carbon atoms, and the charge/discharge capacity thereof is 372 mAh/g.

Therefore, with the aim of achieving a further increase in the capacity of the non-aqueous electrolyte secondary battery, many studies have been undertaken on negative electrode materials. Among them is a proposal to improve carbon materials in order to achieve an increased battery capacity. For example, it has been reported that amorphous carbons and low crystalline carbons have a capacity much higher than the theoretical capacity of graphite (e.g., the 39th Battery Symposium Abstract volume, pp. 443–444 (3D12)).

Although amorphous carbons and low crystalline carbons have large theoretical capacity, they have the problem of having large irreversible capacity. The irreversible capacity refers to a capacity attributed to, of the Li ions absorbed in a carbon material, the Li ions which remain captured in the carbon material to be incapable of being desorbed during the subsequent discharge process and thus do not participate in the battery reaction any longer.

When a carbon material has irreversible capacity, a portion of Li ions which have been supplied to the carbon material in the negative electrode from a lithium-containing complex oxide in the positive electrode during the initial charge, is not able to return to the positive electrode during the subsequent discharge. Even in such case where a carbon material having large theoretical capacity is employed, it is difficult to obtain a high-capacity battery if the material has large irreversible capacity.

As a countermeasure against the irreversible capacity of a carbon material, an electrode formation process has been devised, by which lithium in an amount corresponding to the irreversible capacity is electrochemically charged into the carbon material in advance. The electrode formation process is excellent in that the formation can be controlled according to the amount of current to be passed. However, it necessitates charging an electrode once and using the electrode again to assemble a battery, resulting in complicated steps and low productivity.

As another countermeasure, a method of compensating for the irreversible capacity has been devised, which involves attaching metallic lithium to the negative electrode to automatically allow Li ions to move between the carbon material and the metallic lithium, which are in a state of short-circuit with the electrode interposed therebetween. In the case of this method, however, Li ions may not sufficiently move depending on the form of the electrode plate, so that metallic lithium remains in the negative electrode to cause variations in performance, safety problems and the like.

For the reasons as set forth above, little progress has been made in the practical use of amorphous carbons and low crystalline carbons, despite of the fact that they are promising as the negative electrode material.

Therefore, there is a demand for effective techniques that can be used in place of the ones described above in order to compensate for the irreversible capacity of carbon materials.

DISCLOSURE OF INVENTION

The present invention offers an effective technique to compensate for the irreversible capacity of a negative electrode containing a carbon material having high theoretical capacity.

More specifically, the present invention relates to a negative electrode for a non-aqueous electrolyte secondary battery comprising: 100 parts by weight of a carbon material having irreversible capacity during the initial charge and discharge; and 20 to 150 parts by weight of a lithium-containing complex nitride represented by the general formula $Li_{3-x}M_xN$ wherein M is at least one selected from the group consisting of Co, Ni, Mn and Cu, and wherein $0.2 \leq X \leq 0.8$.

The lithium-containing complex nitride is preferably $Li_{3-x}Co_xN$ wherein $0.2 \leq X \leq 0.55$.

The carbon material is preferably a low or less crystalline carbon.

The low crystalline carbon is preferably in a fibrous form having a mean fiber diameter of 1 to 50 $\mu$m and a mean fiber length of 10 to 200 $\mu$m.

Alternatively, the carbon material is preferably an amorphous carbon.

In the case where the carbon material is an amorphous carbon, the negative electrode preferably contains 33 to 150 parts by weight of the lithium-containing complex nitride per 100 parts by weight of the amorphous carbon.

The present invention also related to a non-aqueous electrolyte secondary battery comprising: a positive electrode comprising a lithium-containing complex oxide capable of absorbing and desorbing lithium ion; the above-described negative electrode; and a non-aqueous electrolyte interposed between the positive electrode and negative electrode.

The present invention is effective for, for example, a negative electrode comprising a carbon material with a theoretical capacity of not less than 350 mAh/g. Such carbon materials include a low crystalline carbon and an amorphous carbon.

The amorphous carbon refers to a carbon material which is not graphitized even when sintered at a high temperature exceeding 1400° C., and is generally called a hard carbon.

The low crystalline carbon refers to a carbon material prepared by intentionally sintering at a low temperature of from 700° C. to 1400° C., a material which is graphitized when sintered at a high temperature exceeding 1400° C., and is generally called a soft carbon.

The low crystalline carbon and amorphous carbon have a specific surface area of, for example, 0.5 to 2 $m^2/g$. Accordingly, the low crystalline carbon and amorphous carbon are less likely to cause a side reaction such as electrolyte decomposition.

The low crystalline carbon and amorphous carbon have a bulk density of, for example, about 1.0 g/cc. Therefore, the low crystalline carbon and amorphous carbon have good volumetric efficiency.

On the other hand, acetylene black, which has conventionally been contained in batteries, has a specific surface area of about 70 $m^2/g$, bulk density of about 0.03 g/cc and theoretical capacity of not more than 100 mAh/g.

BEST MODE FOR CARRYING OUT THE INVENTION

In the present invention, the irreversible capacity of a carbon material having large theoretical capacity such as an amorphous carbon or low crystalline carbon, is compensated for by Li ions in a lithium-containing complex nitride.

The negative electrode of the present invention comprises a carbon material as the main negative electrode material, a lithium-containing complex nitride as an auxiliary negative electrode material, and a binder. The lithium-containing complex nitride preferably has high capacity as well as excellent reversibility in charge and discharge.

Techniques employing the lithium-containing complex nitride as an active material for batteries are relatively new, and examples include the following.

Japanese Unexamined Patent Publication No. Hei 7-78609 discloses a lithium nitride-metal compound as an electrode material for an electrochemical device. The lithium-containing complex nitride having high capacity and excellent reversibility in charge/discharge is represented by the general formula: $Li_{3-x}M_xN$, which is obtained by replacing a portion of Li in the lithium nitride $Li_3N$ by a transition metal such as copper, iron, manganese, cobalt or nickel. The nitride wherein the value of X satisfies $0.2<X\leq0.8$ has particularly high capacity.

The present inventors have found that a lithium-containing complex nitride represented by the general formula: $Li_{3-x}Co_xN$ ($0.3\leq X \leq 0.55$) wherein the transition metal is cobalt, has a high capacity of not less than 700 mAh/g as well as excellent reversibility in charge and discharge.

The compensation of Li ions from the lithium-containing complex nitride to the carbon material in the negative electrode is performed by electrochemical action in the presence of an electrolyte after constructing a battery.

The reaction potential of the lithium-containing complex nitride and the reaction potential of the carbon material are different from each other, and therefore local cells are formed in the negative electrode. The carbon material has various reaction potentials. In the case where the carbon material has a reaction potential higher than the reaction potential of the lithium-containing complex nitride, the potential difference causes Li ions to automatically transfer from the lithium-containing complex nitride to the carbon material. Alternatively, in the case where the carbon material has a reaction potential lower than the reaction potential of the lithium-containing complex nitride, the potential difference does not cause the automatic transfer of Li ions; however, Li ions are supplied from the positive electrode into the carbon material during the initial charge. Then, Li ions in an amount corresponding to the irreversible capacity attributed to the Li ions incapable of returning to the positive electrode during the subsequent discharge, are supplied from the lithium-containing complex nitride to the positive electrode. Ultimately, the irreversible capacity is completely compensated for by the lithium-containing complex nitride.

After the initial discharge, the positive electrode has returned to the initial discharged state in which Li ions are fully charged therein. Moreover, the carbon material in the negative electrode is in a discharged state in which Li ions in an amount corresponding to the irreversible capacity have already been compensated for, and the lithium-containing complex nitride is also in a discharged state in which Li ions in an amount corresponding to the above-described irreversible capacity have been desorbed therefrom.

Therefore, the amount of the lithium-containing complex nitride contained in the negative electrode is preferably equivalent to, or slightly greater than the amount corresponding to the irreversible capacity of the carbon material. Too large an amount of the lithium-containing complex nitride results in an increase in the amount of the nitride which does not participate in charge/discharge and thus is a disadvantage in increasing the battery capacity.

It is difficult to ascertain the irreversible capacity of a carbon material in an actual battery; however, according to studies conducted by the present inventors, the most suitable amount of the lithium-containing complex nitride represented by the general formula: $Li_{3-x}Co_xN$ ($0.3 \leq X \leq 0.55$) is 33 to 150 parts by weight per 100 parts by weight of an amorphous carbon in the case where the carbon material is an amorphous carbon, and 20 to 150 parts by weight per 100 parts by weight of a low crystalline carbon in the case where the carbon material is a low crystalline carbon.

As described above, the present invention makes it possible to utilize even a carbon material, which, despite having a great capacity, has hitherto been difficult to be put into practical use because of the irreversible capacity.

The negative electrode of the present invention is fabricated, for example, by applying to the surface of a negative electrode current collector, a mixture prepared by mixing a carbon material powder having high capacity and irreversible capacity, a lithium-containing complex nitride powder and a binder resin.

Since the lithium-containing complex nitride is highly reactive with water and hence suffers degradation from water, the solvent used for, for example, the preparation of the mixture is preferably a highly dehydrated one.

Since the amorphous carbon and low crystalline carbon have lower electronic conductivity compared to graphite, it is preferable to add a conductive agent into the above-described mixture to improve the conductivity of the negative electrode. As the conductive agent, any material having excellent electronic conductivity may be used; for example, artificial graphite, acetylene black or carbon fiber is preferably used. However, since the carbon material and lithium-containing complex nitride as the negative electrode materials have a certain degree of electronic conductivity, it is possible to construct a battery without addition of any conductive agent.

The amorphous carbon is produced, for example, by subjecting a starting material such as a phenol resin, epoxy resin or isotropic pitch to a curing process at 100 to 300° C. in air, followed by sintering at 700 to 1400° C. in an inert atmosphere such as nitrogen or argon.

The low crystalline carbon is produced by sintering a pitch, polymer or the like at 700 to 1400° C. in an inert atmosphere. As the pitch, a petroleum pitch, coal tar pitch, mesophase pitch or the like is preferably used, and polyimide or the like is preferably used as the polymer.

The low crystalline carbon is preferably in a fibrous form having a mean fiber diameter of 1 to 50 $\mu$m and a mean fiber length of 10 to 200 $\mu$m. In the case where a fibrous carbon is employed, the fibrous carbon is dispersed between particles of the lithium-containing complex nitride in the mixture, and therefore the electronic conductivity between the nitride particles can be improved to enhance the battery performance. Moreover, it is possible to reduce the amount of any other conductive agent for use in the negative electrode. Consequently, the content proportion of the lithium-containing complex nitride in the negative electrode is increased, so that the capacity of the negative electrode can also be increased.

In order to produce the fibrous low crystalline carbon, firstly, a starting material such as a mesophase pitch is heated at 100 to 300° C. to be softened, followed by a spinning process. Thereafter, a curing process may be performed on the fiber surface by heating the fiber obtained through the spinning process in an oxidizing atmosphere such as oxygen or air. By sintering the fiber thus obtained at 700 to 1400° C. in an inert atmosphere, it is possible to produce the fibrous low crystalline carbon.

As other components of the negative electrode used in the present invention, such as a negative electrode current collector, conventionally known components may be used.

The positive electrode used in the present invention preferably comprises a lithium-containing complex oxide such as $Li_xCoO_2$, $Li_xNiO_2$ or $Li_xMnO_2$. Although the mean particle size of the lithium-containing complex oxide is not specifically limited, it is preferably 1 to 30 $\mu$m.

As the positive electrode conductive agent, positive electrode current collector and other components of the positive electrode used in the present invention, conventionally known components may be used.

The non-aqueous electrolyte of the present invention comprises a solvent and a lithium salt dissolved in the solvent. In particular, it is preferable to use a non-aqueous electrolyte prepared by dissolving $LiPF_6$ as a solute in a mixed solvent containing at least ethylene carbonate and ethylmethyl carbonate. The concentration of the solute in the non-aqueous electrolyte is preferably 0.2 to 2 mol/L, more preferably 0.5 to 1.5 mol/L.

Additionally, any other compound may be added to the electrolyte as an additive in order to improve discharging and charge/discharge characteristics and the like.

Among the shapes of batteries are a coin type, button type, sheet type, laminated type, cylindrical type, flat type and prismatic type, and the present invention is applicable to any of these.

In the following, the present invention is described by reference to examples.

EXAMPLE 1

A description is made on the case where an amorphous carbon was used as a negative electrode active material.

The amorphous carbon was produced by sintering a polyamide resin at 2700° C. under an inert atmosphere.

In general, sintering a starting material such as a petroleum coke at such a high temperature causes the crystal to grow to yield graphite. However, sintering a starting material such as a polyamide resin at a high temperature does not cause the crystal to grow, so that an amorphous carbon is produced. The sintered material was pulverized to have a mean particle size of about 15 $\mu$m and used in a powder form. The X-ray diffraction pattern of this powder showed a broad profile, which was peculiar to amorphous carbons.

Next, the charge/discharge performance of this amorphous carbon was confirmed in the following manner.

100 parts by weight of powder of the amorphous carbon, 2 parts by weight at resin component of an aqueous dispersion of styrene butadiene rubber (SBR) as a binder and an aqueous solution of 1 wt % carboxymethyl cellulose (CMC) were mixed together and then sufficiently kneaded to give a mixture. This mixture was applied to a copper foil by using a doctor blade, dried and then rolled by means of a roller to form an electrode sheet.

This electrode sheet was punched into a disc shape and then used to fabricate a coin-type model cell having a counter electrode comprising metallic lithium. The inside of the model cell was filled with an electrolyte. The electrolyte was prepared by dissolving $LiPF_6$ at a concentration of 1 mol/L, in a mixed solvent containing ethylene carbonate and ethylmethyl carbonate at a volume ratio of 1:1.

Then, the charge/discharge behavior and capacity of the model cell were confirmed. The charging and discharging were performed at a constant current of 0.3 mA/cm$^2$, with the end-of-discharge voltage set at 1.5 V, and the end-of-charge voltage at 0 V.

The amorphous carbon absorbed Li ions in an amount corresponding to about 860 mAh/g during the initial charge; however, it desorbed Li ions in an amount corresponding to only about 630 mAh/g during the subsequent discharge, having an irreversible capacity of about 230 mAh/g. Thereafter, the charging and discharging proceeded reversibly.

Next, a description is made on the case where $Li_{2.5}Co_{0.5}N$ having a low reaction potential and excellent reversibility was used as a lithium-containing complex nitride. The lithium-containing complex nitride was synthesized in the following manner.

Lithium nitride ($Li_3N$) powder and metallic cobalt powder, each of which was a commercially available reagent, were mixed together at a predetermined ratio, and the mixture thus obtained was placed in a container made of copper, followed by sintering at 700° C. for 8 hours in an nitrogen atmosphere. As a result, a blackish gray lithium-containing complex nitride was produced as a sintered material. The produced lithium-containing complex nitride was pulverized and used in a powder form. It should be noted that the series of steps, starting from mixing of the starting materials to pulverization of the sintered material, were performed in a nitrogen atmosphere of high purity having the total concentration of not more than 100 ppm of oxygen and water. The X-ray diffraction pattern of the obtained lithium-containing complex nitride powder was a hexagonal pattern as in the case of lithium nitride, showing no impurity peak.

The obtained $Li_{2.5}Co_{0.5}N$ powder was used to fabricate a model cell similar to the one described above having a counter electrode comprising metallic lithium, and the charge/discharge behavior and capacity were confirmed. Herein, since nitrides react with water, the SBR dissolved in a dehydrated organic solvent was used.

The $Li_{2.5}Co_{0.5}N$ desorbed Li ions in an amount corresponding to about 750 mAh/g during the initial discharge, and it also absorbed Li ions in an amount corresponding to about 750 mAh/g during the subsequent charge, having almost no irreversible capacity. Thereafter, the charging and discharging continued to proceed with the reversible capacity maintained at about 750 mAh/g.

Figure 1:
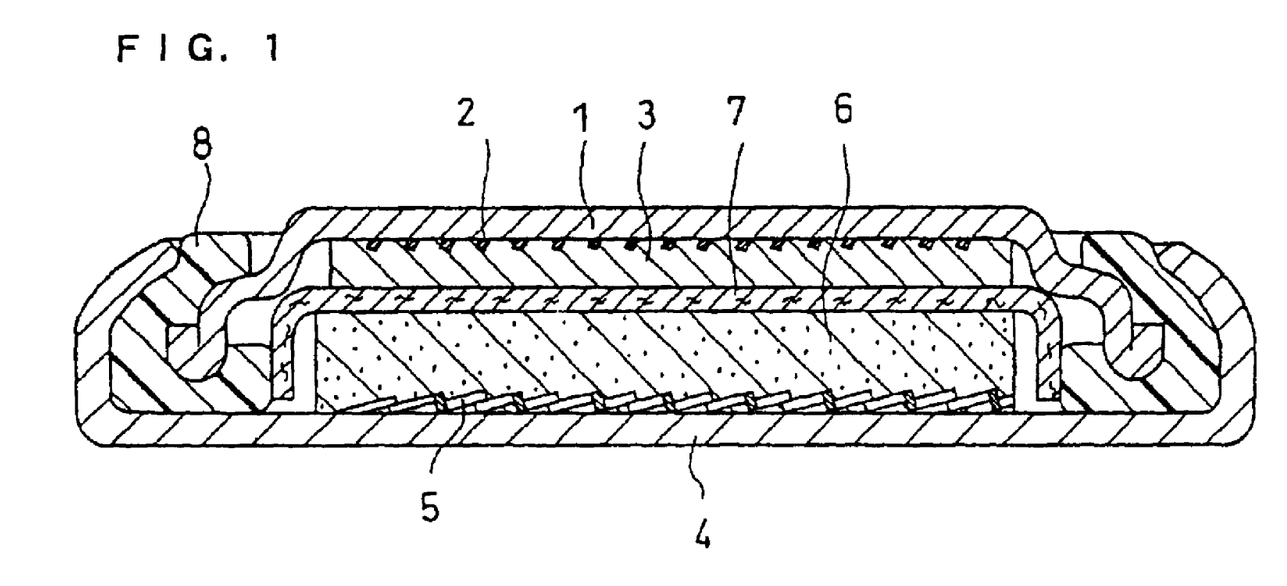
FIG. 1 is a vertical sectional view of a button-type test cell.

Next, a negative electrode comprising the above-described amorphous carbon powder and $Li_{2.5}Co_{0.5}N$ powder was formed, and this was used to fabricate a button-type test cell as shown in FIG. 1. Then, the cycle characteristic of the test cell was evaluated.

In FIG. 1, numeral 1 denotes a sealing plate made of stainless steel serving also as a negative electrode terminal. To the inner surface of the sealing plate, a nickel mesh 2 is welded, and the nickel mesh 2 is attached by pressure onto a copper foil serving as the current collector of a negative electrode 3. The negative electrode 3 was formed by applying a mixture containing the amorphous carbon and $Li_{2.5}Co_{0.5}N$ to the copper foil.

Numeral 4 denotes a positive electrode case made of stainless steel, and a stainless steel mesh 5 is welded to the inner surface of the case. The stainless steel mesh 5 is attached by pressure onto an aluminum foil serving as the current collector of a positive electrode 6. The positive electrode 6 was formed by applying a mixture containing $LiCoO_2$ as an active material to the aluminum foil and punching it into a disc shape.

The surface of the positive electrode 6 is covered with a porous separator 7 made of a polyethylene film. The inside of the positive electrode case 4 is filled with an electrolyte, and the separator 7 is swollen with the electrolyte.

On the periphery of the sealing plate 1, a gasket 8 is disposed, and the end portion of the opening of the positive electrode case 4 is bent towards the inside so as to clamp the gasket 8 thereby to seal the battery. The gasket 8 ensures electrical insulation between the sealing plate 1 and the positive electrode case 4.

Herein, the negative electrode was fabricated in the following manner.

To 100 parts by weight of powder of the amorphous carbon, 40 parts by weight of $Li_{2.5}Co_{0.5}N$ powder, 20 parts by weight of acetylene black as a conductive agent and 2 parts by weight of the SBR as a binder were added and mixed, and the mixture thus obtained was dispersed in a dehydrated toluene to give a slurry-like mixture. This mixture was applied, by using a doctor blade, onto a copper foil with a thickness of 18 μm serving as a negative electrode current collector, which was dried and then rolled to form an negative electrode sheet. This negative electrode sheet was punched into a disc-shaped negative electrode plate with a diameter of 16 mm.

Additionally, the positive electrode was fabricated in the following manner.

To 100 parts by weight of lithium cobaltate powder, 7 parts by weight of carbon powder as a conductive agent and 3 parts by weight of poly(vinylidene fluoride) resin as a binder were added, and the mixture thus obtained was dispersed in a dehydrated N-Methyl-pyrrolidinone to give a slurry-like mixture. This mixture was applied, by using a doctor blade, onto an aluminum foil with a thickness of 20 μm serving as a positive electrode current collector, which was dried and then rolled to form a positive electrode sheet. This positive electrode sheet was punched into a disc-shaped positive electrode plate with a diameter of 15 mm.

Additionally, the electrolyte was prepared by dissolving $LiPF_6$ at a concentration of 1 mol/L, in a mixed solvent containing ethylene carbonate and ethylmethyl carbonate at a volume ratio of 1:1.

0.5 g of lithium cobaltate as the positive electrode active material and 0.12 g of the total amount of the amorphous carbon and $Li_{2.5}Co_{0.5}N$ as the negative electrode active materials were contained in the test cell.

Charging/discharging test was conducted on the produced test cell at a constant current of 1 mA, with the end-of-charge voltage set at 4.1 V and the end-of-discharge voltage at 2.0 V.

Figure 2:
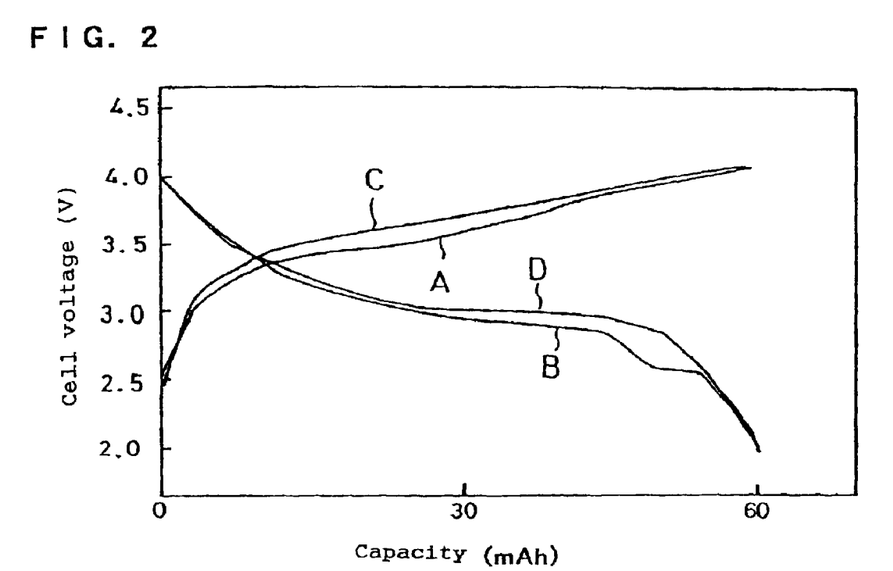
FIG. 2 is a graph showing the relation between the charge/discharge voltages and capacities at 1st cycle and 5th cycle, of the test cell of Example 1.

FIG. 2 shows: (A) the relation between the charge voltage and capacity at 1st cycle; (B) the relation between the discharge voltage and capacity at 1st cycle; (C) the relation between the charge voltage and capacity at 5th cycle; and (D) the relation between the discharge voltage and capacity at 5th cycle, of the test cell.

It should be noted that the average discharge voltage was about 3.2 V and the discharge capacity was about 60 mAh. Although the charging/discharging of this battery was started with charging, there is almost no difference between the charge capacity and the discharge capacity at 1st cycle in FIG. 2, indicating that the irreversible capacity of the amorphous carbon was effectively compensated for by $Li_{2.5}Co_{0.5}N$. Additionally, since there is almost no difference between the charge capacity and discharge capacity at 1st cycle and the charge capacity and discharge capacity at 5th cycle, it is shown that the test cell had excellent cycle characteristic.

In FIG. 2, the charge/discharge voltage behavior at 1st cycle is different from the charge/discharge voltage behavior at 5th cycle. At and after 2nd cycle, the charge/discharge voltage behavior is substantially the same as that at 5th cycle, and only the initial charge/discharge exhibits a peculiar charge/discharge behavior. This is attributed to the fact that $Li_{2.5}Co_{0.5}N$ did not participate in the initial charge since the reaction potential of the amorphous carbon was lower than the reaction potential of $Li_{2.5}Co_{0.5}N$, and that $Li_{2.5}Co_{0.5}N$ transformed into amorphous during the initial discharge to change the voltage profile.

Next, the capacity density of the negative electrode active material per weight in this battery was estimated.

The capacity density of lithium cobaltate in the positive electrode was about 120 mAh/g, which was the same as the theoretical value. Further, the battery was limited by the positive electrode during the operation. Accordingly, the total capacity of the amorphous carbon and $Li_{2.5}Co_{0.5}N$, each of which was contained in the negative electrode, was not less than the capacity of the positive electrode.

From the above, since 0.5 g of lithium cobaltate and 0.12 g of the total amount of the amorphous carbon and $Li_{2.5}Co_{0.5}N$ were contained in the test cell, the capacity density of the negative electrode was estimated to be not less than 500 mAh/g.

In view of the fact that carbon materials in the negative electrodes of currently commercialized lithium ion batteries have a capacity density of about 300 to 370 mAh/g, the battery of the present invention has a negative electrode with an extremely high capacity.

Next, test cells were fabricated in the same manner as described above except that the value of X and the amount were changed for the lithium-containing complex nitride $Li_{3-x}Co_xN$. Herein, for each battery, the amount of lithium cobaltate contained in the positive electrode was adjusted to 0.5 g and the total amount of the amorphous carbon and $Li_{3-x}Co_xN$ contained in the negative electrode was adjusted to 0.12 g. The discharge capacities (mAh) at 5th cycle obtained from the respective batteries are shown in Table 1.

TABLE 1

| Value of X | Amount of nitride per 100 parts by weight of amorphous carbon (part by weight) | | | | | | | | | | |
|---|---|---|---|---|---|---|---|---|---|---|---|
| | 0 | 20 | 30 | 33 | 40 | 50 | 70 | 80 | 100 | 120 | 150 | 180 |
| 0.2 | 32 | 42 | 46 | 47 | 49 | 52 | 56 | 56 | 55 | 55 | 53 | 43 |
| 0.3 | 32 | 51 | 58 | 60 | 60 | 60 | 60 | 57 | 55 | 55 | 53 | 41 |
| 0.4 | 32 | 53 | 60 | 60 | 60 | 60 | 60 | 57 | 55 | 55 | 53 | 44 |
| 0.5 | 32 | 52 | 59 | 60 | 60 | 60 | 60 | 57 | 55 | 55 | 53 | 42 |
| 0.55 | 32 | 51 | 58 | 60 | 60 | 60 | 60 | 57 | 55 | 55 | 53 | 43 |
| 0.6 | 32 | 45 | 50 | 51 | 54 | 58 | 60 | 57 | 54 | 54 | 53 | 39 |

(mAh)

In Table 1, the batteries using the negative electrodes containing no lithium-containing complex nitride or containing the same in a small amount were deprived of Li ions owing to the irreversible capacity of the amorphous carbon, so that the discharge capacities were lower than the theoretical capacities. Conversely, in the case of the batteries using the negative electrode containing the lithium-containing complex nitride in a large amount, the amount of the nitride that did not participate in the charge/discharge increased to cause the batteries to be limited by the negative electrode, so that the discharge capacities were lower than the theoretical capacities. Although these batteries had higher capacity as compared to conventional ones, the present invention produced a particularly remarkable effect when the negative electrode contained a certain amount or more of the nitride, or when the battery was limited by the positive electrode.

According to Table 1, when the negative electrode contained 20 to 150 parts by weight, more preferably 33 to 70 parts by weight of $Li_{3-x}Co_xN$ ($0.3 \leq X \leq 0.55$) per 100 parts by weight of the amorphous carbon, it was possible to yield a desirable battery performance.

EXAMPLE 2

A phenol resin was sintered at 1200° C. under an inert atmosphere to give an amorphous carbon. This was used to fabricate a model cell similar to that of Example 1 to evaluate the charge/discharge performance.

This amorphous carbon absorbed Li ions in an amount corresponding to about 800 mAh/g during the initial charge; however, it desorbed Li ions in an amount corresponding to only about 460 mAh/g during the subsequent discharge, having an irreversible capacity of about 340 mAh/g.

With the use of this amorphous carbon and $Li_{2.5}Co_{0.5}N$, test cells similar to those of Example 1 were fabricated by employing 20, 33, 70, 100, 120, 150 and 180 parts by weight of the nitride, respectively, per 100 parts by weight of the amorphous carbon, and the cycle tests were conducted.

The discharge capacities (mAh) at 5th cycle obtained from the respective batteries are shown in Table 2.

TABLE 2

| | Amount of nitride per 100 parts by weight of amorphous carbon (part by weight) | | | | | | |
|---|---|---|---|---|---|---|---|
| | 20 | 33 | 70 | 100 | 120 | 150 | 180 |
| Discharge capacity (mAh) | 51 | 60 | 60 | 60 | 60 | 59 | 51 |

According to Table 2, it was most suitable to include 33 to 150 parts by weight of the nitride per 100 parts by weight of the amorphous carbon in the negative electrode. It is considered that the use of a phenol resin as the starting material for this amorphous carbon caused the laminated structure of carbon to become more isotropic as compared to that of Example 1 and thereby provided good electronic conductivity between the active material particles. It is presumably for this reason that favorable results were obtained even in the cases where the amount of the nitride was relatively large.

EXAMPLE 3

In this example, a description is made on the case where a low crystalline carbon was used as a negative electrode active material. The low crystalline carbon was one prepared by sintering a petroleum pitch at 1100° C. under an inert atmosphere.

In general, sintering a petroleum pitch at a high temperature of about 3000° C. causes the crystal to grow to yield graphite. However, as in this example, sintering a petroleum pitch at a low temperature of about 1100° C. does not cause the crystal to grow, so that an extremely low-crystalline carbon material is produced. In the X-ray diffraction pattern of the produced carbon material, a distinct peak as observed in a high crystalline graphite was not confirmed.

Next, this low crystalline carbon was used to fabricate a model cell similar to that of Example 1 to evaluate the charge/discharge performance.

This low crystalline carbon absorbed Li ions in an amount corresponding to about 775 mAh/g during the initial charge; however, it desorbed Li ions in an amount corresponding to only about 610 mAh/g during the subsequent discharge, having an irreversible capacity of about 165 mAh/g. Thereafter, the charging and discharging proceeded reversibly.

Next, the low crystalline carbon and $Li_{2.5}Co_{0.5}N$ were used to fabricate a test cell similar to that of Example 1 to evaluate the cycle characteristic. The negative electrode comprising the low crystalline carbon and $Li_{2.5}Co_{0.5}N$ was produced in the same manner as in Example 1 except that the low crystalline carbon was used in place of the amorphous carbon.

It should be noted that 0.5 g of lithium cobaltate as the positive electrode active material and 0.12 g of the total amount of the low crystalline carbon and $Li_{2.5}Co_{0.5}N$ as the negative electrode active materials were contained in the test cell.

Charging/discharging test was conducted on the test cell at a constant current of 1 mA, with the end-of-charge voltage set at 4.1 V and the end-of-discharge voltage at 2.0 V.

Figure 3:
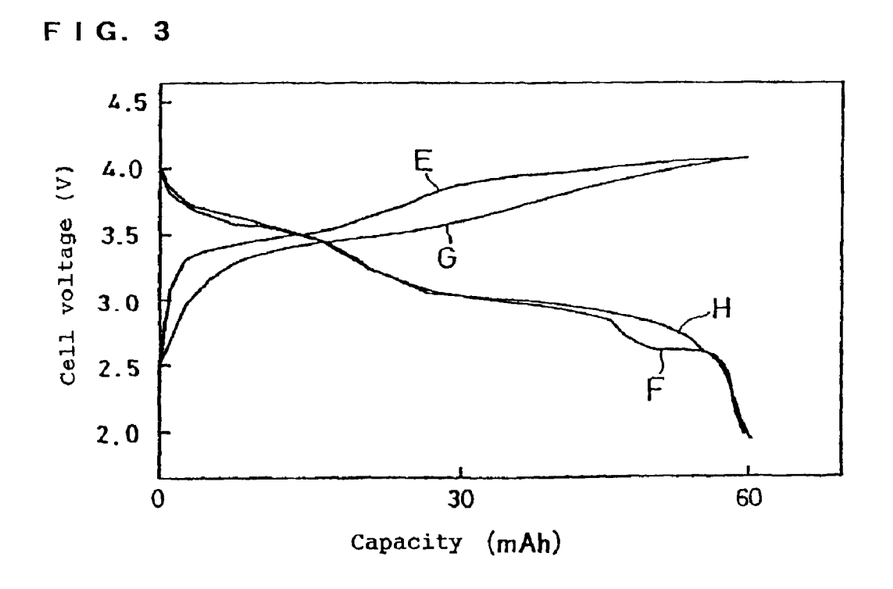
FIG. 3 is a graph showing the relation between the charge/discharge voltages and capacities at 1st cycle and 5th cycle, of the test cell of Example 3.

FIG. 3 shows: (E) the relation between the charge voltage and capacity at 1st cycle; (F) the relation between the discharge voltage and capacity at 1st cycle; (G) the relation between the charge voltage and capacity at 5th cycle; and (H) the relation between the discharge voltage and capacity at 5th cycle, of the test cell.

The average discharge voltage was about 3.1 V and the discharge capacity was about 60 mAh. Although the charging/discharging of this battery was started with charging, there is almost no difference between the charge capacity and discharge capacity at 1st cycle in FIG. 3, indicating that the irreversible capacity of the low crystalline carbon was effectively compensated for by $Li_{2.5}Co_{0.5}N$. Additionally, since there is almost no difference between the charge capacity and discharge capacity at 1st cycle and the charge capacity and discharge capacity at 5th cycle, it is shown that the test cell had excellent cycle characteristic.

It should be noted that a change of the voltage profile as shown in FIG. 2 due to the transformation of $Li_{2.5}Co_{0.5}N$ into amorphous was also observed in this case.

The capacity density of the negative electrode per weight of the active material in this battery was estimated in the same manner as in Example 1. As with Example 1, the battery of the present example was also limited by the positive electrode during the operation. Therefore, the low crystalline carbon and $Li_{2.5}Co_{0.5}N$ were estimated to have a capacity density of not less than 500 mAh/g.

Next, test cells were fabricated in the same manner as described above except that the value of X and the amount were changed for the lithium-containing complex nitride $Li_{3-x}Co_xN$. Herein, for each battery, the amount of lithium cobaltate contained in the positive electrode was adjusted to 0.5 g, the total amount of the low crystalline carbon and $Li_{3-x}Co_xN$ contained in the negative electrode was adjusted to 0.12 g. The discharge capacities (mAh) at 5th cycle obtained from the respective batteries are shown in Table 3.

TABLE 3

| Value of X | Amount of nitride per 100 parts by weight of low crystalline carbon (part by weight) | | | | | | | | | |
|---|---|---|---|---|---|---|---|---|---|---|
| | 0 | 20 | 25 | 30 | 50 | 55 | 60 | 100 | 120 | 150 | 180 |
| 0.2 | 40 | 48 | 50 | 52 | 57 | 58 | 57 | 55 | 55 | 53 | 44 |
| 0.3 | 40 | 57 | 60 | 60 | 60 | 60 | 58 | 56 | 55 | 53 | 42 |
| 0.4 | 40 | 59 | 60 | 60 | 60 | 60 | 58 | 56 | 55 | 54 | 43 |
| 0.5 | 40 | 58 | 60 | 60 | 60 | 60 | 58 | 56 | 55 | 54 | 41 |
| 0.55 | 40 | 57 | 60 | 60 | 60 | 60 | 58 | 56 | 55 | 54 | 42 |
| 0.6 | 40 | 51 | 54 | 56 | 60 | 60 | 58 | 54 | 54 | 53 | 41 |

(mAh)

In Table 3, the batteries using the negative electrodes containing no lithium-containing complex nitride or containing the same in a small amount were deprived of Li ions owing to the irreversible capacity of the low crystalline carbon, so that the discharge capacities were lower than the theoretical capacities. Conversely, in the case of the batteries using the negative electrode containing the lithium-containing complex nitride in a large amount, the amount of the nitride that did not participate in the charge/discharge increased to cause the battery to be limited by the negative electrode, so that the discharge capacities were lower than the theoretical capacities. Although these batteries had higher capacity as compared to conventional batteries, the present invention produced a particularly remarkable effect when the negative electrode contained a certain amount or more of the nitride, or when the battery was limited by the positive electrode.

According to Table 3, when the negative electrode contained 20 to 150 parts by weight, more preferably 20 to 55 parts by weight of $Li_{3-x}Co_xN$ ($0.3 \leq X \leq 0.55$) per 100 parts by weight of the low crystalline carbon, it was possible to yield a desirable battery performance.

EXAMPLE 4

A mesophase pitch produced by polymerizing naphthalene was sintered for one hour at 700° C. under an inert atmosphere to give a low crystalline carbon. This was used to fabricate a model cell similar to that of Example 1 to evaluate the charge/discharge performance. This crystalline carbon absorbed Li ions in an amount corresponding to about 970 mAh/g during the initial charge; however, it desorbed Li ions in an amount corresponding to only about 660 mAh/g during the subsequent discharge, having an irreversible capacity of about 310 mAh/g. With the use of this low crystalline carbon and $Li_{2.5}Co_{0.5}N$, test cells similar to those of Example 1 were fabricated by employing 20, 25, 70, 100, 120, 150 and 180 parts by weight of the nitride, respectively, per 100 parts by weight the low crystalline carbon, and the cycle tests were conducted. The discharge capacities (mAh) at 5th cycle obtained from the respective batteries are shown in Table 4.

TABLE 4

| | Amount of nitride per 100 parts by weight of low crystalline carbon (part by weight) | | | | | | |
|---|---|---|---|---|---|---|---|
| | 20 | 25 | 70 | 100 | 120 | 150 | 180 |
| Discharge capacity (mAh) | 45 | 58 | 60 | 60 | 60 | 60 | 53 |

Table 4 demonstrates that it was most suitable to include 25 to 150 parts by weight of the nitride per 100 parts by weight of the low crystalline carbon, in the negative electrode. It is considered that, the use of a mesophase pitch as the starting material for this low crystalline carbon caused the laminated structure of carbon to become more isotropic as compared to that of Example 3 and thereby provided good electronic conductivity between the active material particles. It is presumably for this reason that the favorable results were obtained even in the cases where the amount of the nitride was relatively large.

EXAMPLE 5

In this example, a description is made on the case where a fibrous low crystalline carbon was used as a negative electrode active material. The fibrous low crystalline carbon was one prepared by softening a mesophase pitch at 200° C. and then transforming it into a fibrous form through a spinning process, followed by a curing process for 12 hours at 150° C. in air, and thereafter, sintering it for 5 hours at 700° C. under an inert atmosphere.

Then, the obtained sintered material was pulverized and observed with SEM, and a fibrous carbon having a mean fiber diameter of 10 μm and a mean fiber length of 100 μm was observed.

Next, this fibrous carbon was used to fabricate a model cell similar to that of Example 1 to evaluate the charge/discharge performance.

This fibrous carbon absorbed Li ions in an amount corresponding to about 1000 mAh/g during the initial charge; however, it desorbed Li ions in an amount corresponding to only about 700 mAh/g during the subsequent discharge, having an irreversible capacity of about 300 mAh/g. Thereafter, the charging and discharging proceeded reversibly.

Next, the fibrous carbon and $Li_{2.5}Co_{0.5}N$ were used to fabricate a test cell similar to that of Example 1 to evaluate the cycle characteristic.

The negative electrode comprising the fibrous carbon and $Li_{2.5}Co_{0.5}N$ was fabricated in the same manner as in Example 1, except for using the fibrous carbon in place of amorphous carbon and adding to 100 parts by weight of the fibrous carbon powder, 55 parts by weight of $Li_{2.5}Co_{0.5}N$ powder, 20 parts by weight of acetylene black as a conductive agent and the SBR as a binder.

It should be noted that 0.5 g of lithium cobaltate and 0.12 g of the total amount of the fibrous carbon and $Li_{2.5}Co_{0.5}N$ were contained in the test cell.

Charging/discharging test was conducted on the produced test cell (hereinafter, referred to as "Battery A") at a constant current of 1 mA, with the end-of-charge voltage set at 4.1 V and the end-of-discharge voltage at 2.0 V. The average discharge voltage was about 3.1 V and the discharge capacity was about 60 mAh.

Although the charging/discharging of this battery was started with charging, there is almost no difference between the charge capacity and discharge capacity at 1st cycle, indicating that the irreversible capacity of the fibrous carbon was effectively compensated for by $Li_{2.5}Co_{0.5}N$. Additionally, since there was almost no difference between the charge and discharge capacities at 1st cycle and those at 30th cycle, it was shown that this test cell also had excellent cycle characteristic.

Next, Batteries B, C and D were fabricated in the same manner as that used in Battery A except that the amount of acetylene black as the conductive agent per 100 parts by weight of the fibrous carbon was changed to 10, 5 and 1 part by weight, respectively.

The discharge capacities (mAh) of the respective batteries at 1st cycle and 30th cycle are shown in Table 5.

TABLE 5

| | Amount of acetylene black (part by weight) | Discharge capacity at 1st cycle (mAh) | Discharge capacity at 30th cycle (mAh) |
|---|---|---|---|
| Battery A | 20 | 60 | 60 |
| Battery B | 10 | 66 | 65 |
| Battery C | 5 | 68 | 67 |
| Battery D | 1 | 72 | 70 |

In Table 5, in the case where the fibrous carbon was used as the low crystalline carbon, no significant reduction was observed in the cycle characteristic even when the amount of acetylene black as the conductive agent was reduced. The reason is presumably that the reduction in electronic conductivity of the nitride was suppressed since the fibrous carbon functioned as the conductive agent, in place of acetylene black. Further, the reduction of acetylene black resulted in the increase of the content proportion of the nitride and low crystalline carbon in the electrode plate, thereby also achieving an advantage of yielding a high capacity battery.

From the above, it was found that the use of a fibrous carbon as a low crystalline carbon could yield a battery having high capacity and excellent cycle characteristic.

INDUSTRIAL APPLICABILITY

As described above, it is possible to maximize the utilization of a large charge/discharge capacity inherently possessed by an amorphous carbon or low crystalline carbon by compensating for the irreversible capacity of the amorphous carbon or low crystalline carbon by a lithium-containing complex nitride having high capacity, thereby providing a non-aqueous electrolyte secondary battery having high capacity and excellent cycle reversibility.

What is claimed is:

1. A negative electrode for a non-aqueous electrolyte secondary battery comprising: 100 parts by weight of a carbon material selected from the group consisting of an amorphous carbon and a low crystalline carbon and having irreversible capacity during an initial charge and discharge; and 20 to 150 parts by weight of a lithium-containing complex nitride represented by the general formula $Li_{3-x}M_xN$ wherein M is at least one selected from the group consisting of Co, Ni, Mn and Cu, and wherein $0.2 \leq X \leq 0.8$.

2. The negative electrode for a non-aqueous electrolyte secondary battery in accordance with claim 1, wherein said lithium-containing complex nitride is $Li_{3-x}Co_xN$ wherein $0.2 \leq X \leq 0.55$.

3. The negative electrode for a non-aqueous electrolyte secondary battery in accordance with claim 1, wherein said low crystalline carbon is in a fibrous form having a mean fiber diameter of 1 to 50 $\mu$m and a mean fiber length of 10 to 200 $\mu$m.

4. A non-aqueous electrolyte secondary battery comprising: a positive electrode comprising a lithium-containing complex oxide capable of absorbing and desorbing lithium ion; the negative electrode in accordance with claim 1; and a non-aqueous electrolyte interposed between said positive electrode and negative electrode.

* * * * *

UNITED STATES PATENT AND TRADEMARK OFFICE
CERTIFICATE OF CORRECTION

PATENT NO. : 6,846,593 B2
DATED : January 25, 2005
INVENTOR(S) : Junichi Yamaura et al.

It is certified that error appears in the above-identified patent and that said Letters Patent is hereby corrected as shown below:

Title page,
Item [54], Title, "EMPLOYING" should read -- USING --;

Column 14,
Line 32, "$xM_xN$" should read -- $_xM_xN$ --.

Signed and Sealed this

Seventh Day of June, 2005

JON W. DUDAS
*Director of the United States Patent and Trademark Office*